J. T. STONEY.
METHOD OF MAKING MOLDS WITH GREENSAND CORES.
APPLICATION FILED MAR. 11, 1919.
1,344,737.
Patented June 29, 1920.
2 SHEETS—SHEET 1.
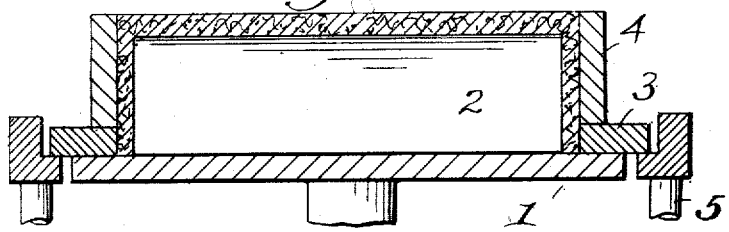
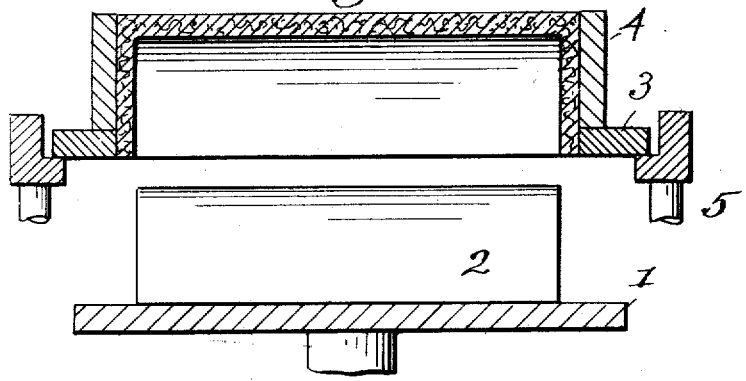
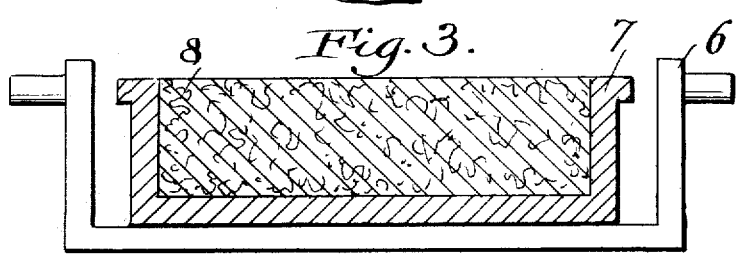
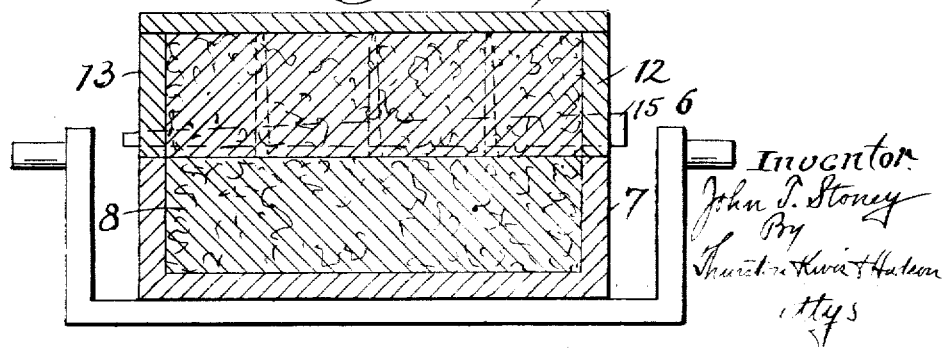

J. T. STONEY.
METHOD OF MAKING MOLDS WITH GREENSAND CORES.
APPLICATION FILED MAR. 11, 1919.

1,344,737.  Patented June 29, 1920.
3 SHEETS—SHEET 2.

Inventor
John T. Stoney
By Thurston Kwis & Hudson
attys.

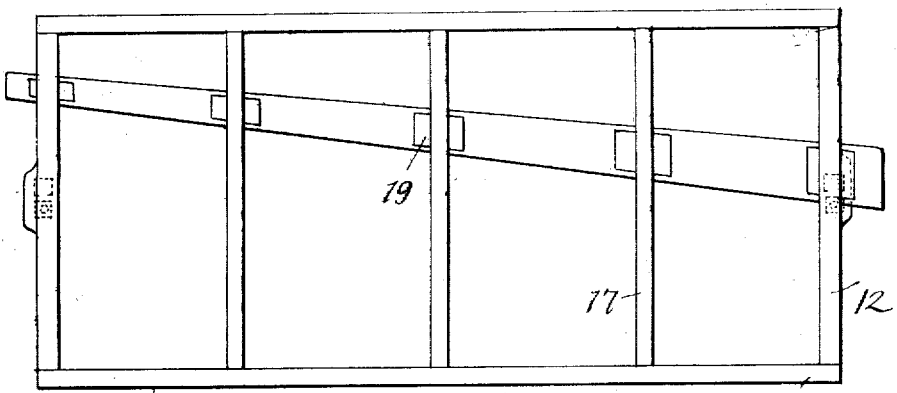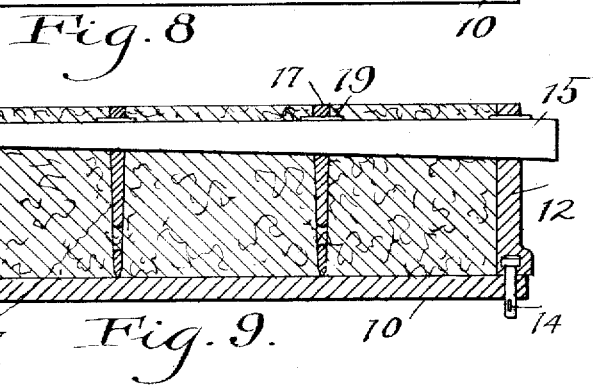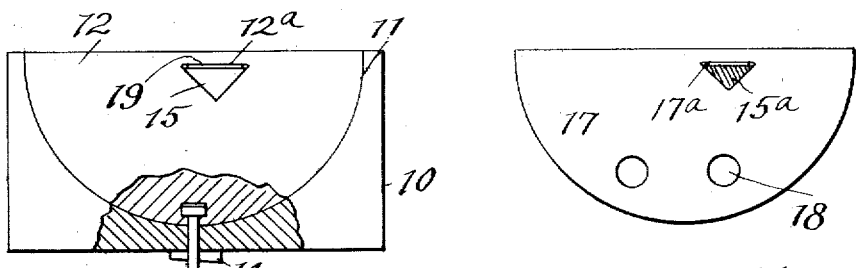

UNITED STATES PATENT OFFICE.

JOHN T. STONEY, OF CLEVELAND, OHIO.

METHOD OF MAKING MOLDS WITH GREENSAND CORES.

1,344,737. Specification of Letters Patent. Patented June 29, 1920.

Application filed March 11, 1919. Serial No. 281,945.

*To all whom it may concern:*

Be it known that I, JOHN T. STONEY, a citizen of the United States, residing at Cleveland, in the county of Cuyahoga and State of Ohio, have invented a certain new and useful Improvement in Methods of Making Molds with Greensand Cores, of which the following is a full, clear, and exact description.

The present invention is directed to a method of making a mold having a green sand core.

I am aware that it has heretofore been known to make a mold having a green sand core, but the method herein presented, which is particularly advantageous in the making of molds wherein the core is of comparatively large size and of considerable weight, the proposed method is particularly advantageous, and so far as I am aware, is entirely new.

The usual custom in making molds employing cores is to make the cores of baked sand, these cores being prepared previous to the making of the mold, and when they are prepared in a manner which is well-known and suitably baked, they are possessed of considerable inherent strength and are entirely able to support their own weight.

On the contrary, a green sand core has practically no inherent strength, and if it be used particularly where the core is of large size and considerable weight, it is a problem to support the green sand core in a fashion such that it will support its own weight.

The advantages to be obtained by using a green sand core in a mold are numerous. In the first place, it permits the core to be made at the same time the mold is made, thus effecting a tremendous saving in time in the making of a mold, and furthermore, it results in enabling a given force of workmen to make a greater number of molds in a given time than where the baked sand core is used, and as will be immediately appreciated, both of the foregoing constructions result in cheapening the cost of production in making castings from the mold, which is of great importance from the standpoint of production cost.

The present invention may be briefly described as comprising the method and the steps thereof disclosed in the accompanying claims.

Figure 5:
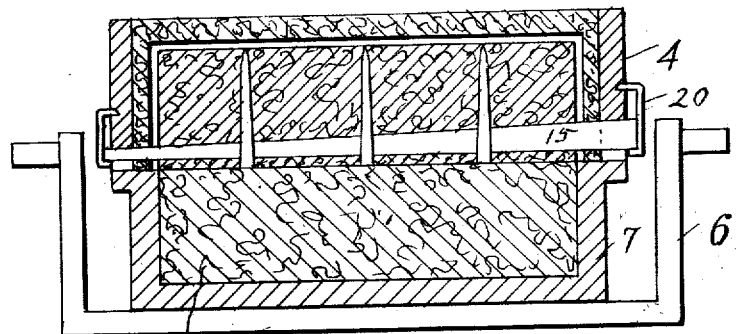
Figure 6:
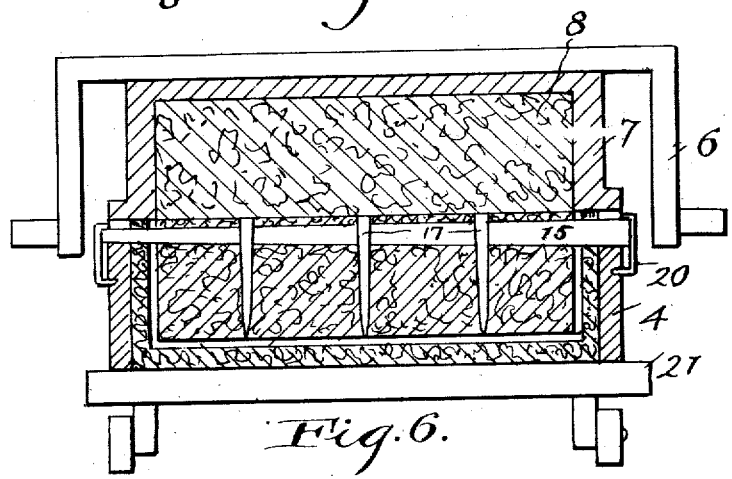
Figure 7:
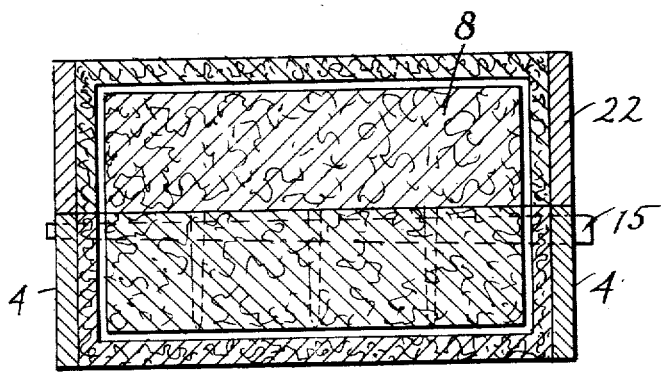

Reference should be had to the accompanying drawings forming a part of this specification in which Figures 1 to 7 are more or less diagrammatic, representing the different steps in the making of a mold according to the method disclosed herein. Fig. 1 shows in sectional elevation, portions of a molding machine, a flask, a pattern in the making of the drag of a mold; Fig. 2 is a sectional elevation showing the apparatus of Fig. 1 with the pattern drawn from the mold; Fig. 3 is an elevation with portions in section of a portion of a roll-over molding machine with a core box thereon and core formed in the box; Fig. 4 is a sectional elevation embracing the same elements shown in Fig. 3 but having a green sand core in its core box superimposed upon the core box shown in Fig. 3; Fig. 5 is a sectional elevation showing a roll-over molding table, a two-part green sand core with the drag of a mold placed over a portion of the green sand core; Fig. 6 shows an elevation with portions in section of the elements shown in Fig. 5 in inverted position with a car beneath the same; Fig. 7 shows a completed mold made in accordance with the present invention; Fig. 8 is a top plan view of a core box with an arbor therein; Fig. 9 is a sectional elevation showing the core box of Fig. 8 with sand baked therein; Fig. 10 is an end elevation of the core box shown in Fig. 8; and Fig. 11 is an end elevation of a plate forming part of the collapsible arbor shown in Figs. 8 and 9.

In proceeding with the description of the invention, it will of necessity involve the reference to certain apparatus which is used in connection therewith, and in carrying out the various steps of my invention. However, it should be understood that the particular apparatus described, forms no essential part of the present invention, and no attempt is made herein to describe the apparatus in its completeness. The various forms of apparatus which are indicated in the drawings are all well-known in the art, and any suitable form of apparatus may be employed in carrying out the invention.

Referring to Fig. 1, 1 indicates the jar and table of a molding machine, and upon this table there is secured a pattern 2, lying upon the table 1 is a stripping plate 3, which stripping plate is as usual, provided with an opening conforming with the base of the pattern. Resting upon the stripping plate is a flask 4, which in the present instance is destined to form the drag of the mold which is to be made. Sand is introduced within the flask 4 in the usual manner, and the mold is made by usual methods.

In Fig. 2 the same apparatus as shown in Fig. 1 is again depicted, with the pattern drawn from the mold, and for this purpose there is associated with the stripping plate 3, suitable uprights 5 which may be operated in any desired manner to raise the stripping plate, and with it the flask 4 with its contained sand.

In Fig. 3 there is shown a roll-over table 6, which table carries a core box 7, and within the core box there is molded a green sand core 8.

The green sand core which is shown in Fig. 3, forms a portion of, preferably one-half of the finished green sand core, and the other portion of the green sand core will now be described, and for this purpose reference to Figs. 8 to 11 should be had.

In Fig. 8 there is shown a core box 10. This core box at its ends is provided with substantially semi-circular openings, one of which is indicated at 11, and it will be understood that at the opposite end there is also a semi-circular opening of the same or different size to that shown in Fig. 10.

Coöperating with the openings in the ends of the core box are plates 12 and 13, these plates being secured in their proper openings each by means of a bolt which occupies a slot in the lower part of the end member with which it is associated, and extends through an opening formed in the bottom of the core box. The bolt is slotted to receive a wedge 14, which when driven home, forms an efficient securing means.

The end members 12 and 13 are provided with openings adjacent their upper parts which are adapted to receive the main member of an arbor.

In the drawings, this main member of the arbor is indicated at 15, and is made triangular in shape, as indicated at 15ª in Fig. 11, as are likewise the openings in the end plates for the core box, as indicated at 12ª in Fig. 10.

The member 15 tapers from one end to the other for a purpose which will be presently described.

Upon the member 15 there are mounted a number of plates such as indicated at 17. One of these plates is shown in elevation in Fig. 11, and as will be seen, each plate is provided with an opening such as indicated at 17ª which is of triangular shape in order to permit the member 15 to pass through the opening. Furthermore, each of the plates 17 is provided with a plurality of openings such as indicated at 18.

The various plates 17 are positioned upon the member 15, and in order to hold these plates securely in their adjusted position, the size of the opening 17ª in the various plates varies in accordance with the position which it is to occupy upon the member 15, the plates having the smaller size opening being toward the end of the member 15 which coöperates with the end member 13 of the core box.

The plates 13 are secured in their proper position by means of wedges such as indicated at 19, these wedges being driven through the opening in the plates 17 and on top of the member 15. When the plates 17 are placed to their proper position, the box is filled with green sand to make the core, and in the making of this core the usual methods may be employed; that is to say, it may be jar rammed or hand rammed as may be desirable. The sand when compacted within the core box extends through the openings 18 which are formed in the plates 17, thus exerting a tying or binding action to prevent the displacement of the sand with respect to the plates 17. The plates 17 are preferably tapered, as indicated in Fig. 9, for the purpose of exerting a wedging action which will assist in holding the sand when the core box is inverted from the position shown in Fig. 9, as is due when forming the mold, which will be described a little later.

The foregoing description is merely broadly indicative of the method of making a green sand core with a collapsible arbor which may be employed in carrying out the process of this invention, and as will be appreciated, the particular configuration of the core box, as well as the particular arrangement of the plates 17 and their disposition within the core box will vary considerably in accordance with the form which the core is made to assume for any particular mold.

The arbor which comprises the member 15 with the plates 17, is a collapsible arbor, that is to say, that when a completed mold has been made, in connection with which the core, such as shown in Fig. 9 has been utilized, the collapsible arbor may be disassembled by driving the member 15 from the plates 7, thus disassembling the arbor and permitting the individual parts thereof to be withdrawn from the interior of the cavity of the casting.

Assuming that the green sand core, or more correctly speaking, the portion of the completed core, is made in substantially the fashion indicated in Fig. 9, this core box is transported by a suitable crane or otherwise, to the roll-over machine with which is associated the core box 7, as shown in Fig. 3, and the core box 10 is inverted and placed upon the top of the core box 7.

Thus we have assembled the complete green sand core, a portion of which core is without interior supporting means while the other portion is provided with interior supporting means.

When the core boxes 7 and 10 are assembled with respect to each other as shown in Fig. 4, the end plates 12 and 13 are removed by loosening the wedges 14 and the wedges which have secured the member 15 in the openings in these said plates at the upper portions thereof. The core box 10 is then withdrawn, leaving the portion of the green sand core with the arbor superimposed upon the green sand core portion within the box 7.

The drag of the mold within the flask 4 is next brought into position and superimposed upon the green sand core portion with the arbor therein as shown in Fig. 5, and the member 15 of the arbor is secured to the flask 4 in any desirable manner as by means of clamps 20, and it should be noted that the member 15 should be rigidly secured to the flask in order that there shall be absolutely no movement of the arbor which is within the flask 4.

The flask 4 is then secured to the core box 7 by means of suitable clamps, and when this is done, the table 6 is caused to roll into inverted position as shown in Fig. 6, and when this has been done, a suitable support such as the car 21 is run beneath the flask 4 and the flask is permitted to rest upon the support or car 21. The roll-over table 6 is then caused to rise, withdrawing the core box 7 from the green sand core 8.

It will thus be seen, as shown in Fig. 6, that the green sand core portion 8 which is without internal support, is superimposed and rests upon the green sand core portion which has the arbor embedded therein. The arbor having the sand tightly packed around the same, forms a sufficient support for holding the green sand core in shape, and is sufficiently strong to support not only its own weight, but the superimposed weight of the green sand core portion 8.

The cope for the complete mold as indicated at 22, is prepared by a separate operation which need not be described as the formation of the cope and drag of the mold proceeds along usual lines. The cope which has thus been formed is brought and superimposed upon the flask 4, so that there is formed the completed mold with the green sand core.

In practice the operations of preparing the drags, the copes for the molds, as well as the parts of the green sand cores proceed simultaneously, and each mold is completed in succession without the necessity of previous preparation of the core.

No description has been given with respect to the completed mold of the usual, pouring gates, etc., as these really form no part of the present invention and are all matters which are well understood by those familiar with this art.

By forming the mold by the method which has been herein described, the green sand core is at all stages held very rigidly with respect to the flasks with which it is associated, and in the various manipulations no opportunity is given for movement of the sand forming the green sand core, and it is this fact which enables the successful use of the green sand core in the making of molds having large cores.

I claim—

1. The method of making a mold which comprises preparing a drag portion of a mold, preparing a portion of a core of green sand without internal support, preparing a part of a green sand core with internal support, superimposing the part of the green sand core with internal support while still in its core box upon the green sand portion without support while the same is still in its core box, withdrawing the core box from the green sand core portion having internal support, superimposing the drag of a mold upon the said core portion having internal support, inverting the said drag of the mold and the core box containing the green sand portion without internal support, withdrawing the core box from the core portion of green sand without internal support and superimposing the cope of the mold upon the drag of the mold.

2. The method of making a mold which comprises preparing a drag portion of a mold preparing a substantially half section of a green sand core without internal support, preparing in a second core box a substantially half portion of a green sand core with internal support, superimposing the core box containing the green sand core with internal support while still in its box upon the core box containing the green sand core portion without internal support, withdrawing the core box from the green sand core portion having internal support, superimposing the drag of the mold upon the said core portion having internal support, securing the said internal support of the core having internal support to the drag flask, inverting the said drag of the mold and the core box containing the green sand core portion without internal support, withdrawing the core box from the core portion of the green sand core without internal support and preparing a cope for the mold and superimposing the cope of the mold upon the drag of the mold.

3. The method of making a mold which comprises preparing a drag of a mold, preparing a cope portion of a mold, preparing in a core box a substantially half portion of a green sand core without internal support, preparing in a sand box a substantially half portion of a green sand core in which an arbor is embedded, the arbor being fastened to this core box, superimposing the core box containing the green sand core portion with its arbor upon the core box containing the green sand portion without internal support, withdrawing the core box from the green sand portion having the embedded arbor superimposing the drag of the mold upon the said core portion having the arbor embedded, securing said arbor to the flask of the drag of the mold, inverting the said drag of the mold and the core box containing the green sand portion without internal support, withdrawing the core box from the core portion of green sand without internal support and superimposing the cope of the mold upon the drag of the mold.

In testimony whereof, I hereunto affix my signature.

JOHN T. STONEY.